April 25, 1950   G. M. PELTZ ET AL   2,505,140
STEREOSCOPIC CAMERA
Filed March 5, 1947   5 Sheets-Sheet 4
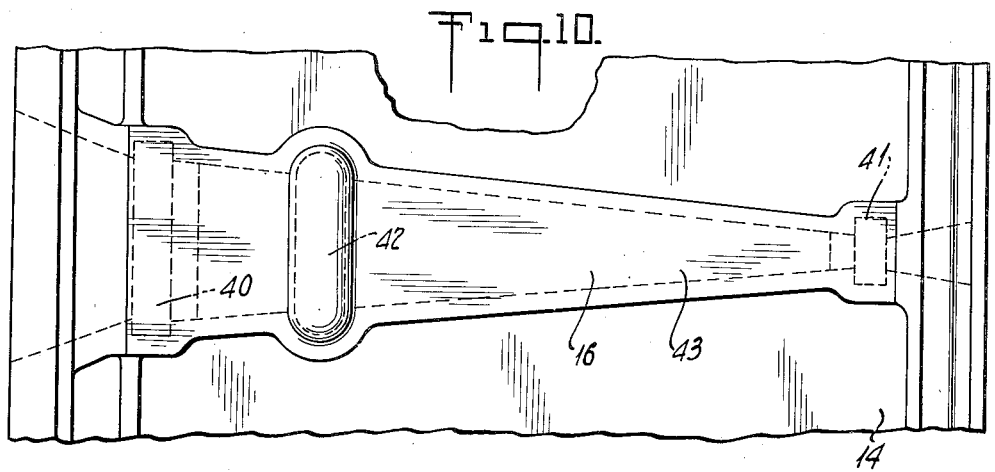
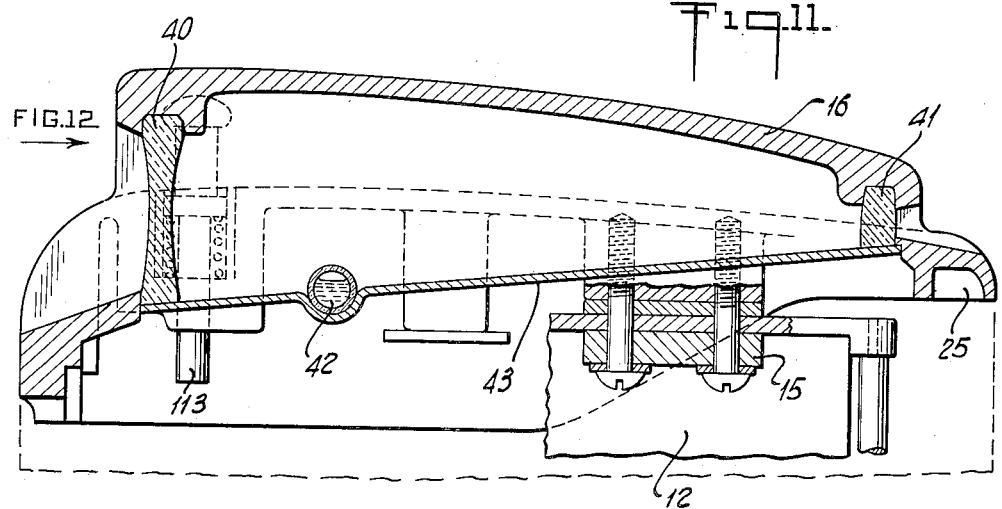
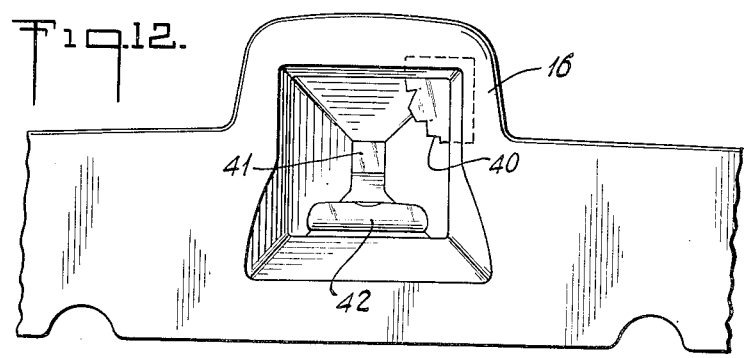
INVENTORS
GORDON PELTZ
and BARBARA IVINS
BY
Watson, Bristol, Johnson & Leavenworth
ATTORNEYS

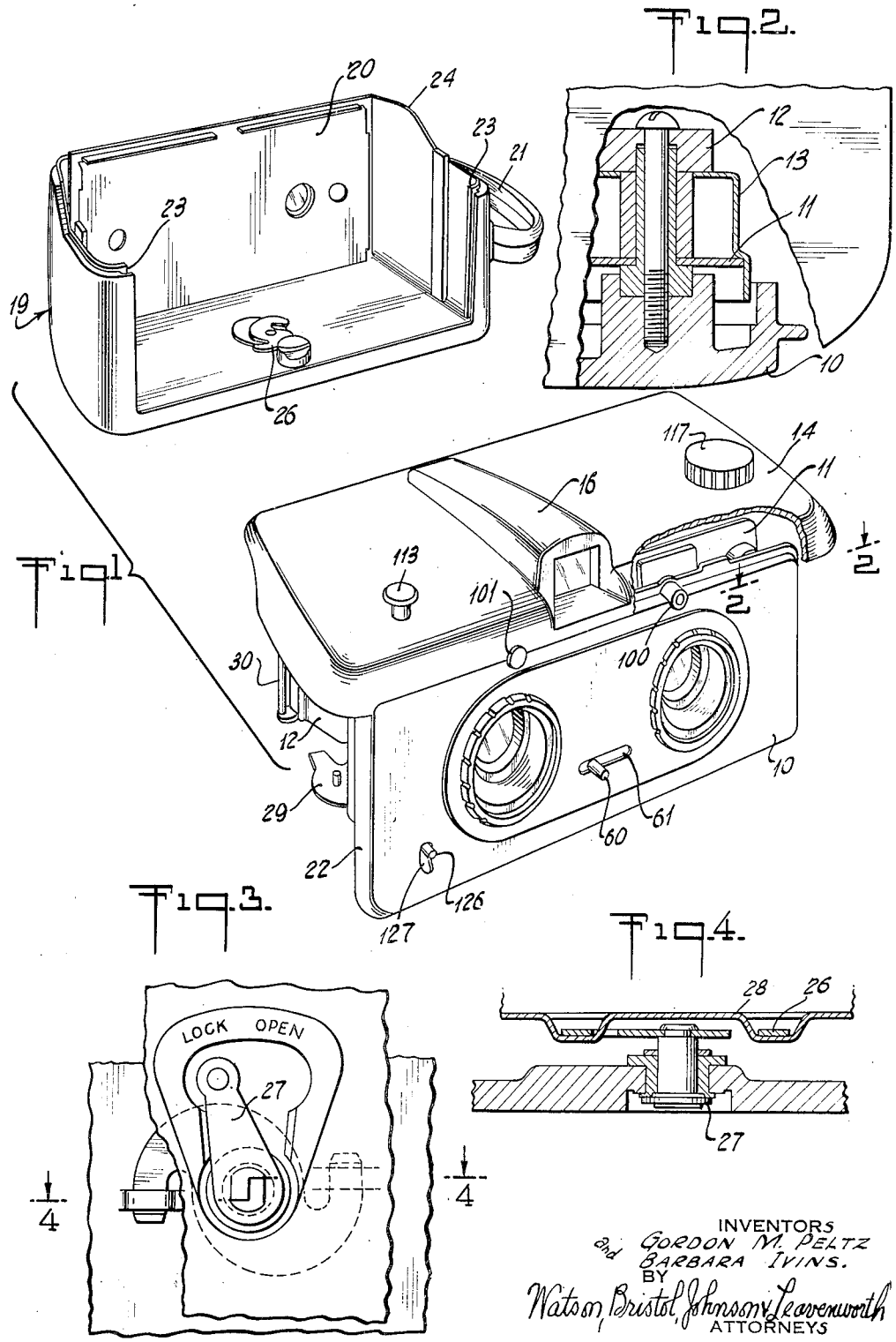

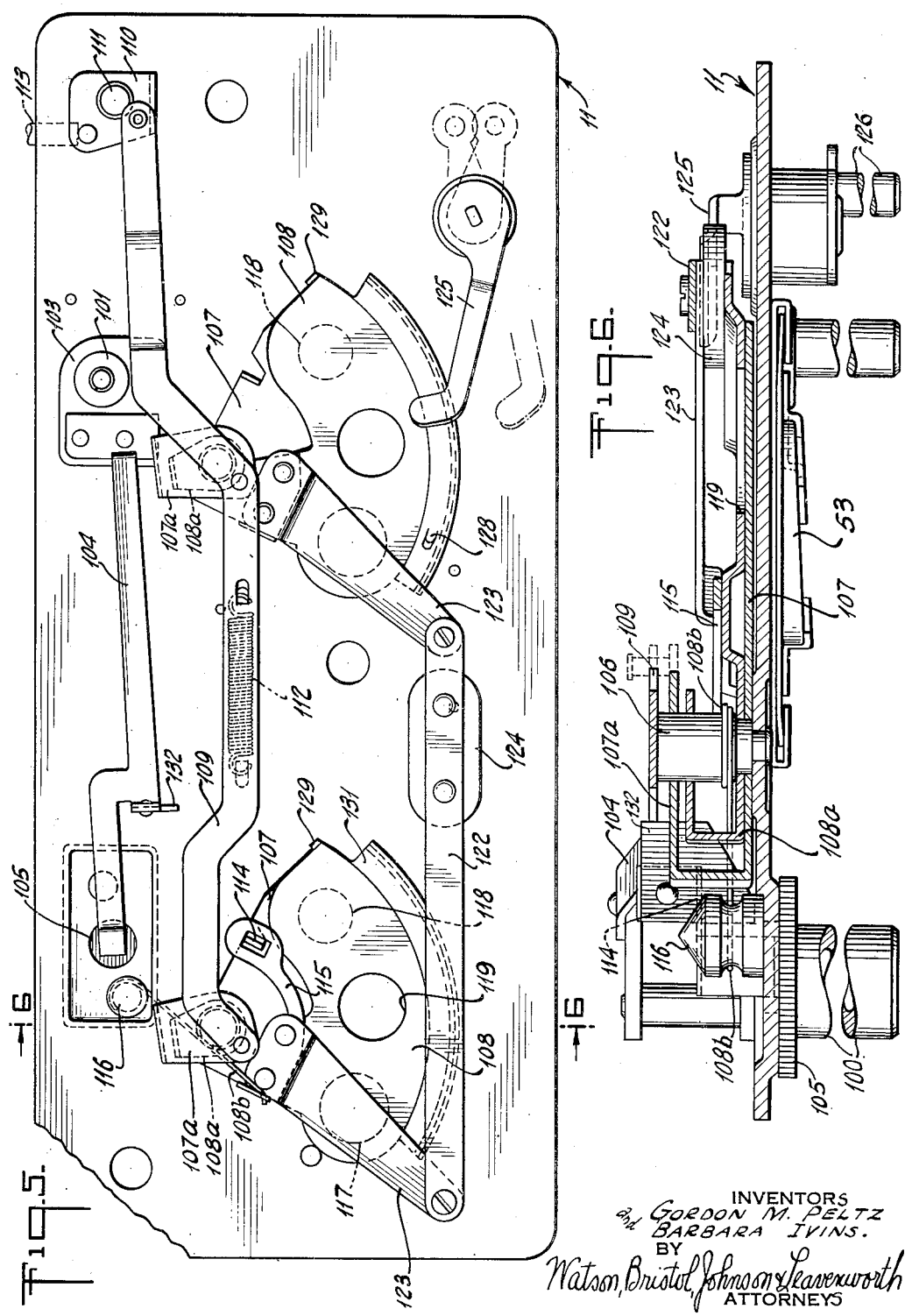

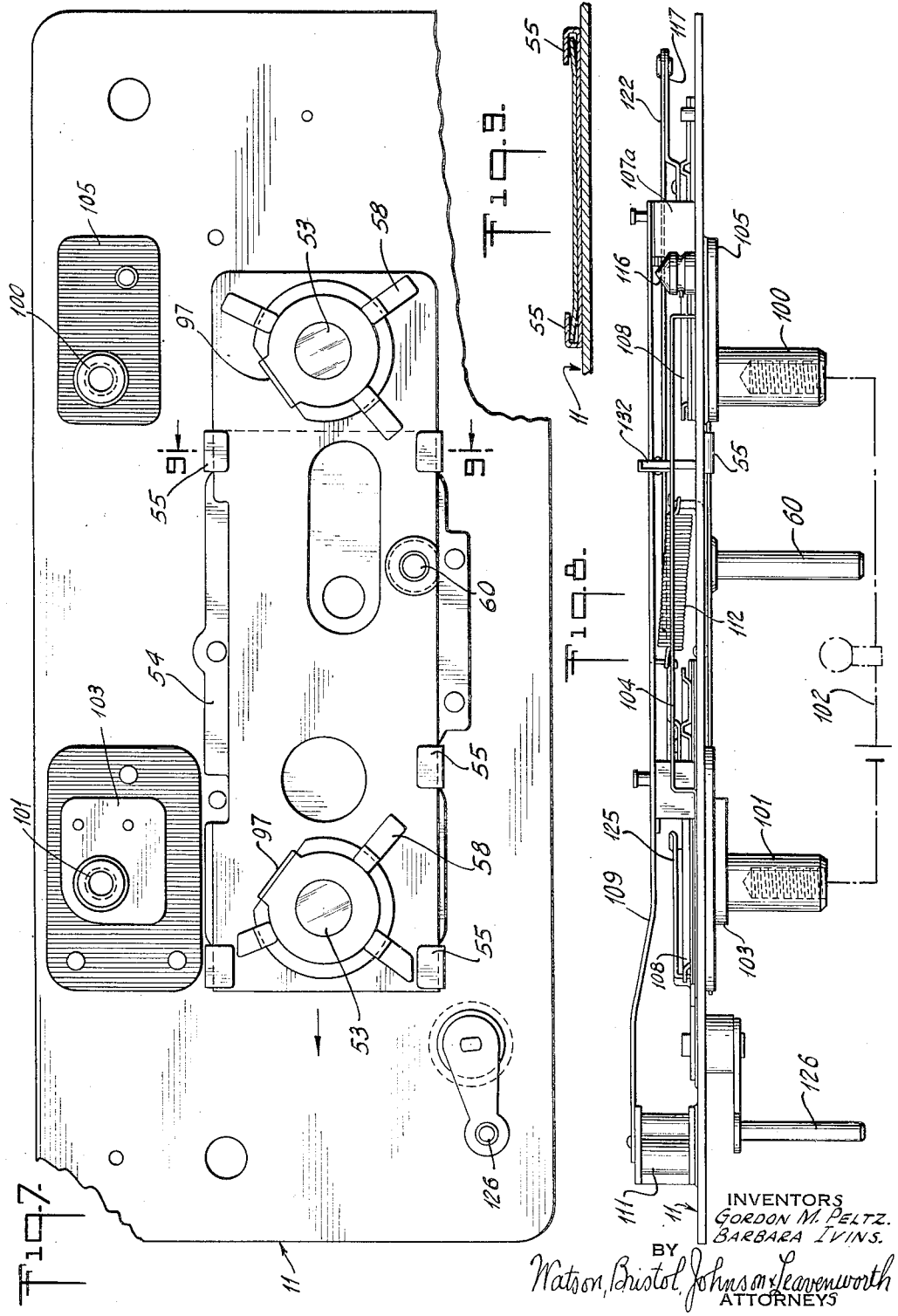

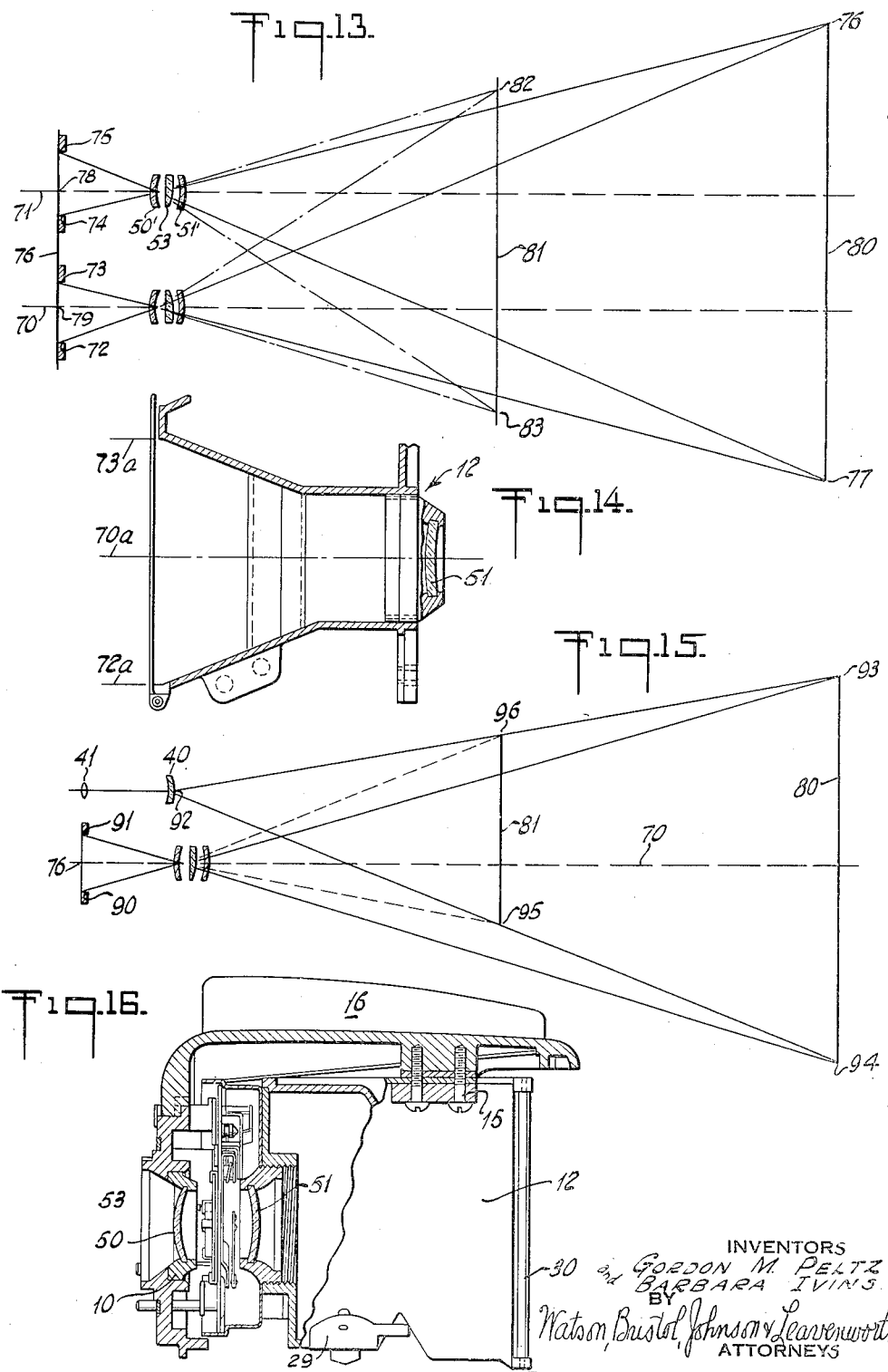

Patented Apr. 25, 1950

2,505,140

UNITED STATES PATENT OFFICE 2,505,140

STEREOSCOPIC CAMERA

Gordon Milligan Peltz, Flushing, and Barbara Ivins, New York, N. Y. assignors to Polaroid Corporation, Cambridge, Mass., a corporation of Delaware Application March 5, 1947, Serial No. 732,612

3 Claims. (Cl. 95—18)

The invention concerns improvements in cameras and, as to certain features or aspects thereof, more particularly cameras of the stereoscopic type.

In the more general aspects the invention relates to the structural arrangement of the parts and the manner of assembly whereby, in opening up the camera in its normal use for removing and inserting film, the camera may be readily separated into two major pre-assembled units, one of the units carrying, however, in rigid permanent arrangement the entire optical system and also the film spools which in the opened condition of the camera are fully exposed and readily accessible.

Further constructional and operating features of the invention of particular importance reside in an improved form of flash bulb synchronizer associated with the shutter mechanism, which avoids the necessity of delicate adjustment, is proof against disturbance by jarring, and capable of continued uniform operation for an indefinite time without wearing out or failure of the parts from repeated use.

The invention also embodies a novel association of level indicating means with the view finder whereby the user is able to observe simultaneously the indicator and the field of view and there is avoided the necessity of shifting repeatedly the direction of the eye from one to the other.

Still further objects are concerned with the optical system including a selectively effective auxiliary lens means particularly as embodied in a camera of the stereoscopic type. In the usual camera which is sighted by means of a view finder, the optical axis of the latter is located above the optical axis of the objective. Hence, there is a short distance between the axis of the view finder and the axis of the camera lens, and a resulting difference in their fields of view. Beyond a close distance to the camera this is not of great importance since the difference in fields due to vertical separation, or vertical parallax, is very slight. In a camera, however, such as is shown herein having a normally fixed focus located at considerable distance, it is frequently desirable to make provision for taking pictures at a shortened distance, as in the making of portraits. At such shortened distance the vertical parallax becomes substantial and a source of inconvenience, as the effort to correct for vertical parallax by tilting the camera is confusing and generally erroneous.

To avoid this undesired parallactic condition, the auxiliary lens means of the present camera for shortening the focus are designed simultaneously to correct for this relative displacement of the fields of view of the objective pair and of the view finder in a vertical plane at the shortened focus of the objectives. This is accomplished by so designing the auxiliary lens means, used to shorten the focus, that when the auxiliary lens means are in operative position they elevate the object field of each objective and cause the lowest border of each objective field to coincide substantially with the lowest border of the field of the view finder.

The invention accordingly comprises the features of construction, combination of elements and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

Fig. 1 is a perspective of the entire camera opened up into its two pre-assembled units adapted to be telescoped together;

Fig. 2 is a fragmentary view taken on the line 2—2 of Fig. 1 of details of means for securing together the lens plate, shutter mechanism and shadow box;

Fig. 3 is a fragmentary view of the bottom of the camera showing the locking lever for securing the two units together;

Fig. 4 is a cross-sectional view taken on the line 4—4 of Fig. 3;

Fig. 5 is a rear view in elevation of the shutter plate and shutter mechanism assembled thereon, including the flash synchronizer;

Fig. 6 is a cross-sectional view taken on the line 6—6 of Fig. 5 but revolved 90° for more economical arrangement on the sheet;

Fig. 7 is a front view of the shutter plate showing the adjustable slide for the auxiliary lens means;

Fig. 8 is a top plan view of the shutter plate assembly but with the auxiliary lens slide omitted;

Fig. 9 is a section taken on the line 9—9 of Fig. 7 showing the mounting for the auxiliary lens slide;

Fig. 10 is a bottom plan view of the cover showing the bottom wall of the view finder, including the mounting for the spirit level;

Fig. 11 is a cross-sectional view taken through the view finder;

Fig. 12 is a front view looking into the view finder, taken in the direction of the arrow 12 of Fig. 11;

Fig. 13 is a schematic diagram of the lens means and the film framing apertures together with the horizontal limiting light rays for the system;

Fig. 14 is a horizontal cross-sectional view through a portion of the shadow box;

Fig. 15 is a schematic diagram similar to that of Fig. 13 but in vertical section and includes the view finder optical means and the relation of the limiting rays for the view finder and one of the film framing apertures; and Fig. 16 is a fragmentary cross-sectional view through the left lens system.

The general arrangement of the camera is shown in Fig. 1, which includes two pre-assembled units adapted to be telescoped together to form the completely assembled camera. In general it is of a stereoscopic, normally fixed focus type. The one assembly includes the front lens plate 10, and the shutter plate 11 which has assembled on the back thereof the shutter mechanism and on the front thereof the auxiliary lens slide means, as will be described more in detail. Mounted to the rear of the shutter plate is the shadow box 12, the elements thus far described being shown fragmentarily in Fig. 2 together with one of the screws for securing them together. The assembly also includes the light baffle 13, shown also in Fig. 16. Rigidly secured with the elements described in the top cover 14 fastened in any suitable manner as, for example, by means of lugs 15 projecting laterally at each end from the shadow box, one of which is shown in Fig. 16 and also in Fig. 11. The cover includes the view finder 16 and also, projecting upwardly from the cover, the knob 17 for advancing the film.

The other unit 19 embodies the bottom, rear and end portions of the camera and includes a suitable film pressure plate 20 and a flexible carrying handle 21 secured on one of the end parts. In assembling the two units together, the unit shown in the lower portion of Fig. 1 is elevated over the other unit and telescoped therein, the tongue portions 22 sliding in complemental grooves 23 of the unit 19, the latter also having tongue portions 24 which seat in corresponding grooves 25 in the cover portion, a cross-section of such a groove being shown in Fig. 11. In assembled position the camera, therefore, is completely light- and dust-proof. The two sub-assemblies are locked together by an S-shaped hasp 26 rotatably mounted in the bottom wall of the camera operated from an exterior lever 27, the fingers of the hasp engaging in suitable loops of a bracket 28 secured to the bottom side of the shadow box.

It will be observed that the entire optical system, including the shadow box and also the film supporting means, are mounted in fixed permanent relation in the one sub-assembly. It may also be noted that with the two sub-assemblies separated the film supporting means is fully exposed and easily accessible, the spools being mounted on suitable supports located at each end of the shadow box, the lower part of the support at one end being shown at 29 in Fig. 1 comprising a flexible plate portion, a similar supporting means appearing in Fig. 16 at the opposite end. The film proceeds from the spool mounted on the support 29, around the roller 30, across the back face of the shadow box, and around a similar roller at the opposite end, to the take-up spool operated from the knob 17.

The view finder is of the sighting type and includes an enclosed channel provided with front and rear lenses of suitable character, indicated at 40 and 41, respectively. Of particular importance is the association with the view finder of a camera level indicator comprising a spirit level 42 embedded in a depression in the plate 43 forming the lower wall of the view finder. Accordingly, in looking through the view finder the level indicator is within the line of vision simultaneously with the view presented to the eye, and the user is enabled to sight the camera and be assured that it is in proper horizontal position without the necessity of having to shift the eye back and forth repeatedly from one to the other. The arrangement therefore provides exceptional convenience and accuracy.

The particular type of objective lenses may vary within the principles of the invention, the specfic form embodied in the present camera being shown in structural relation in Fig. 16 and functionally more clearly in Figs. 13 and 15. The objectives each include a pair of concave-convex elements 50 and 51, the forward element 50 being mounted in the lens plate 10 and the rear element 51 in the forward face of the shadow box. An auxiliary lens 53 for shortening the focus is adapted to be selectively adjusted into and out of the axial path between each pair of the objectives 50 and 51, as shown in cross-section in Fig. 16. The details of the slidable support for the auxiliary lens means are shown more fully in Figs. 7 and 9 and comprise a supporting bracket 54 secured to the forward face of the shutter plate 11 provided with suitable bent-over fingers 55 forming a slot for the plate 56, in which are secured the auxiliary lenses 53 by suitable annular rings 57 held in place by lugs 58. In Fig. 7 the auxiliary lenses are shown in operative position. Moving of the slide to the left in Fig. 7 renders them ineffective. With the slide 56 so adjusted to the left, the opening 59 thereof is positioned in line with the axis of the corresponding fixed lens, the right end of the slide being moved beyond the corresponding light path for the other fixed lens. The adjustment of the slide is effected by means of a pin 60 projecting forwardly from the slide 56 through a slot 61 in the front lens plate 10, as shown particularly in Fig. 1.

There will now be described certain important features and functional characteristics of the auxiliary lens means whereby they are adapted, in addition to shortening the focus, to correct simultaneously for vertical parallax as well as horizontal parallax. It is frequently desirable to take pictures at a distance considerably less than the normal fixed focus of the camera as, for example, at a portrait distance. At such short distances the fields of view of the objectives and of the viewer may be substantially different, and efforts to correct for this vertical parallax by tilting of the camera are normally an approximation only and commonly result in inaccurate and unsatisfactory results. The auxiliary lens herein disclosed is designed when in effective position simultaneously to shorten the focus and correct for the resulting vertical parallax. This feature may be incorporated in various specific forms of optical and image framing systems but is particularly advantageous in conjunction with a system forming the subject matter of an application of Edwin H. Land, Serial No. 732,539, filed March 5, 1947 (now abandoned). The basic principles of such system are shown in Fig. 13.

As here shown each objective embodies two lens elements 50, 51 and 50', 51', respectively, the axes of the two objectives being parallel and in the same horizontal plane. The shiftable auxiliary lens means 53 and 53' are here shown in their operative position, but, assuming that they are shifted to their ineffective position, the objective lenses are designed to be focused on a predetermined point which may be preferably the hyperfocal distance, and the objectives project their respective images through similar apertures indicated at 72, 73 and 74, 75, respectively, formed in a backboard over which the film 76 travels. For the lower or right objective the limiting rays are 72, 76 and 73, 77, and through the left lens the limiting rays are 74, 76 and 75, 77. In accordance with the principles of the invention of said application of Edwin H. Land, the point 78 at which axis 71 intersects the plane of the film is at a less distance from the aperture limit 74 than from the aperture limit 75. Correspondingly, the intersection point 79 for the axis 70 is less distant from the aperture limit 73 than from the aperture limit 72. Also, the lenses are so designed that the corresponding limiting rays for each film framing aperture intersect the points of intersection in Fig. 13, being shown at 76 and 77 lying in a plane 80. This intersection is achieved by shifting or laterally decentering the apertures such that each aperture takes in the similar field of view indicated between the points 76 and 77 in the plane 80. With the lenses focused on the hyperfocal distance, plane 80 is located at one-half of this distance from the camera lenses.

When two pictures of the same scene taken by this stereoscopic camera are mounted in the frames as made by the apertures in which they were taken, near point falls on near point automatically and, when properly viewed, present the scene as though it were looked at through a window at a predetermined distance and of the aperture 76, 77. If this distance is coincident with the near point of sharp focus of the two lenses, i. e., for example, one-half of the hyperfocal distance, nothing nearer can be distinct, while all objects at one-half the hyperfocal distance appear framed in a window at that distance and objects at greater distances appear in back of such plane.

With the auxiliary lens means 53, 53' moved into the operative position as shown in Fig. 13, the plane of focus of the objective lens means is moved toward the objectives to some position such as is indicated in general at the plane 81. In other words, the auxiliary lenses are appropriately designed to bend the rays such that the limiting rays at the shortened plane of focus 81 are now at 75, 83 and 74, 82 for the upper or left objective, and at 73, 83 and 72, 82 for the lower objective, and the same field of view completely fills the respective framing apertures at the shortened focus similarly to when the camera was focused on the plane 80.

It will be understood that the diagram of Fig. 13 is purely illustrative of the principles and not intended to depict actual relative dimensions or shapes of the lenses. The actual arrangement of the lenses and shadow box and film framing apertures for one structural embodiment is more precisely indicated in Figs. 14 and 16. Fig. 14 is a horizontal section through one-half of the shadow box, showing the location of the rear lens of the right objective of the camera and the relation of the axis thereof to the rear film framing aperture. The axis of the lens is indicated at 70a and the limits of the film framing aperture by the lines 72a and 73a, respectively. Similarly to the diagrammatic showing of Fig. 13, the distance between lines 70a and 73a is less than the distance between lines 70a and 72a.

In accordance with the present invention, the same auxiliary lenses are so designed as to correct simultaneously for vertical parallax. This is illustrated in diagrammatic form in Fig. 15, in which the view finder and one of the objective lenses and its corresponding film framing aperture are projected into a common vertical plane. The front and rear lenses of the view finder are shown at 40 and 41, respectively. By proper design of these lenses or location of their axes, or both, they may be caused to take in the same field of view in the vertical plane as that covered by the objectives in their normal plane of focus 80. It will be observed that in Fig. 15 the optical axis 70 is symmetrical with respect to the film aperture 90, 91; that is to say, it cuts the film aperture at its center in the vertical direction. With the auxiliary lens means out of operative position, the limiting rays 92, 93 and 92, 94 intersect the limiting rays 90, 93 and 91, 94 of the objective in the plane 80.

With the auxiliary lens means appropriately arranged and designed in accordance with the principles of the present invention, when in operative position for shortening the focus they are effective also to lift or tilt upwardly the field of view of the objectives so that the limits 95, 96 in the vertical plane 81 at the shortened focal distance of the objective coincides with the field of view in the plane 81 covered by the view finder. The decentered auxiliary lenses therefore serve simultaneously to shorten the focus, correct for stereoscopic or horizontal parallax, and also for vertical or view finder parallax.

Given the principles and purposes to be accomplished, the design of the auxiliary lens is a matter of application of known formulas and mathematical computation for the particular conditions and dimensions. In general, each may combine in one lens a proxar lens (i. e., a positive type supplementary lens) to adjust the focal distance and a prism effect to correct for the vertical and horizontal parallax. Actually the direction of the wedge or prism effect is on a diagonal from the axis of the respective objective lens to the axis of the view finder, the horizontal and vertical components of which are shown in projection in Figs. 13 and 15, respectively. For accurate assembling, the auxiliary lenses may be provided with peripheral flattened portions corresponding to the flattened portions 97 of the supporting rings 57 shown in Fig. 7.

A feature of particular importance now to be described resides in the embodiment in the camera of a novel type of flash synchronizer having distinct advantages over those heretofore employed, the construction and operation of which are shown in Figs. 5 to 8. As shown particularly in Fig. 8, the shutter plate 11 is provided with two terminal posts 100 and 101 to which may be selectively connected a flash bulb circuit of any suitable type, diagrammatically indicated at 102 in Fig. 8. Fig. 1 shows these terminals projecting exteriorly of the casing. The terminal 100 is grounded to the camera frame and thereby the metal operating shutter parts to be described, the terminal 101, however, being insulated from the shutter plate but electrically connected to the small plate 103 on which is fixedly mounted the circuit closing bar 104, shown particularly in Fig. 5. The bar 104 extending to the left of Fig. 5 is free to flex, the left end normally resting on or adjacent to the insert 105 of suitable fiber or other electrically insulating material.

The shutter mechanism is in large part the same for each of the apertures, and the elements of the shutter mechanism at the left in Fig. 5 will first be described, with a later description as to such variations as exist between the two. In general, they are suitably connected to operate in unison. Mounted on a post 106 secured in the shutter plate 11 and projecting rearwardly therefrom is a segmental blade 107 located immediately adjacent the inner surface of the shutter plate having an upper U-shaped portion 107a bent around to provide an additional bearing point on the post 106. Associated with blade 107 is a second blade 108 likewise bent around similarly to the first-mentioned blade, having a U-shaped portion 108a located within the portion 107a. A link 109 is pivoted to the portion 107a of each of the shutter mechanisms, and its extreme right end is pivoted to a rocker plate 110 pivoted on post 111 on the shutter plate. The link 109 is normally biased to the left in Fig. 5 by means of a spring 112, the opposite end of which is connected to a pin on the shutter plate 11. Depression of the shutter button 113 against its spring causes the lower end to engage a pin on plate 110 rotating the latter in a counterclockwise direction in Fig. 5, which pulls bar 109 to the right. Blade 107 is provided with a lug 114, over which is adapted to engage a spring latch 115 secured to the blade 108. In operation, depression of the exposure button 113 pulls bar 109 to the right in Fig. 5, swinging blade 107 in a counterclockwise direction and likewise dragging with it blade 108 through the intermediary of the lug 114. This continues until the end of the flexible latch 115 engages the fixed cam stud 116, lifting the latch away from lug 114 and permittting blade 108 to return to the position shown under the force of coil spring 108b, one extending finger of which engages over the post 110 and the other projecting finger of which is secured under a lug on the left side of the blade 108.

At the instant of release of the blade 108, the opening 117 in blade 107 is positioned over the aperture 118, shown in dotted lines in Fig. 5, and exposure is made when the opening 119 in blade 108 passes across the aligned apertures 117 and 118. The same operation takes place with respect to the shutter mechanism shown at the right in Fig. 5, since the two are connected together by a link 122 pivoted to the respective arms 123. The time of the so-called instantaneous exposure may be controlled by any suitable mechanism, which in the present case consists of an inertia member 124 of suitable weight secured on the connecting link 122.

The shutter mechanism may be selectively set for time exposures by means of the latch 125 operable from the pin 126 projecting from the forward face of the front lens plate through a slot 127, as shown particularly in Fig. 1. In Fig. 5 the latch is set for a time exposure, as shown by the full line position, and when the shutter blades 108 are released by engagement of the latch 115 with the stud 116, the return movement of blade 108 is stopped in the position with its opening 119 over the aligned apertures 117 and 118 by engagement of the lug 128 on the right-hand blade 108 behind the flexible latch 125, in which position both shutter blades 108 remain as long as the button 113 remains depressed, but upon release of the button the blades 107 return under the urge of spring 112 to a point where the lugs 129 on the rear edges of blades 107 engage the back edge of the restrained complementary blades 108, which movement, however, is sufficient for the openings 117 in the blades 107 to have passed the exposure opening 118.

The association with the shutter mechanism of the flash synchronizer and its operation will now be described. As the shutter blades are rotated in a counterclockwise direction by depression of the button 113, the outer flange portion 131 on the shutter blade 107 at the left engages under the cam 132 fixed on the circuit closing bar 104, lifting upwardly with respect to the plane of the paper of Fig. 5 the left end of the bar so that it is clear of the path of the shutter blades, in which position it is suspended until release and return of the blade 108. At such time the flange 131 rides from under the cam 132, permitting the left end of the bar 104 to drop down and contact the under blade 107, completing the electrical circuit, which remains closed until the blade 107 returns to the position shown. The cam 132 is composed of insulating material, and correspondingly the circuit is not closed by contact therewith of the flange 131 of the blade 108.

It will be apparent that the construction is such that repeated use does not result in failure of the mechanism, the construction in all respects being substantial. Also, jarring or shocks have no material effect, since the outer end of the circuit closing bar 104 is suspended over and preferably in engagement normally with the rigid insulated support 105.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described our invention, what we claim as new and desire to secure by Letters Patent is:

1. In a normally fixed focus stereoscopic camera, a pair of horizontally spaced objectives having parallel axes and focused on a plane in space located at substantially the hyperfocal distance, each said objective comprising two lenses, a plate positioned between said two lenses in each objective, exposure openings aligned with said two lenses in said plate, a pair of shutter mechanisms carried on one side of said plate and normally preventing passage of light through said openings, a slide supported by said other side of said plate, a pair of openings in said slide, a pair of lens holders carried by said slide adjacent said openings, a view finder of the sighting type vertically spaced above the plane of said axes, said objectives having associated therewith film framing apertures of the same size each with its center laterally offset horizontally from the axis of its respective objective whereby the corresponding horizontal limiting rays for the two said apertures intersect at a common plane located at substantially one-half the distance to the hyperfocal plane, and an auxiliary lens means for each of said objectives selectively adjustable into appropriate position so as to intersect the axis of its associated objective, each said auxiliary lens means comprising a wedge-shaped lens having a prism effect, said prism effect deviating its respective objective axis towards the axis of the view finder, said lens being adapted and arranged to shorten the focus of said objectives, correct for stereoscopic parallax at the shortened focus and maintain said condition of the limiting rays and also to lift vertically the field of view of said objectives and correct thereby for vertical parallax, each said lens means including a flattened peripheral portion, positioning means forming a part of each of said lens holders for engaging said flattened portion so that said lens means are predeterminedly positioned on said slide, and at least one other opening in said slide, said last-named opening being positionable in alignment with one of said openings in said plate when said auxiliary lens means are moved out of alignment with said objectives.

2. In a normally fixed focus stereoscopic camera, a pair of horizontally spaced objectives having parallel axes and focused on a plane in space located at substantially the hyperfocal distance, a view finder of the sighting type vertically spaced above the plane of said axes, said objectives having associated therewith film framing apertures of the same size each with its center laterally offset horizontally from the axis of its respective objective whereby the corresponding horizontal limiting rays for the two said apertures intersect at a common plane located at substantially one-half the distance to the hyperfocal plane, and an auxiliary lens means for each of said objectives selectively adjustable into appropriate position so as to intersect the axis of its associated objective, said auxiliary lens means being adapted and arranged to shorten the focus of said objectives, correct for stereoscopic parallax at the shortened focus and maintain said condition of the limiting rays and also to lift vertically the field of view of said objectives and correct thereby for vertical parallax, each said auxiliary lens means comprising a single supplementary positive lens which, when in said position, has its axis decentered with respect to its said associated objective axis to give a prism effect, said prism effect deviating its respective objective axis towards said view finder axis.

3. In a normally fixed focus stereoscopic camera, a pair of horizontally spaced objectives having parallel axes and focused on a plane in space located at substantially the hyperfocal distance, each said objective comprising two lenses, means defining a pair of exposure openings aligned with said objectives, a pair of shutter mechanisms normally preventing passage of light through said openings, an auxiliary lens holder slidably associated with said means defining the exposure openings, a view finder of the sighting type vertically spaced above the plane of said axes, said objectives having associated therewith film framing apertures of the same size each with its center laterally offset horizontally from the axis of its respective objective whereby the corresponding horizontal limiting rays for the two said apertures intersect at a common plane located at substantially one-half the distance to the hyperfocal plane, and an auxiliary lens means for each of said objectives selectively adjustable into appropriate position so as to intersect the axis of its associated objective, each said auxiliary lens means comprising a wedge-shaped lens having a prism effect, said prism effect deviating its respective objective axis towards the axis of the view finder, said wedge-shaped lens being adapted and arranged to shorten the focus of said objectives, correct for stereoscopic parallax at the shortened focus and maintain said condition of the limiting rays and also to lift vertically the field of view of said objectives and correct thereby for vertical parallax, each said auxiliary lens means including an aligning portion, positioning means forming a part of said auxiliary lens holder for engaging said aligning portion so that said auxiliary lens means are predeterminedly positioned on said holding means, said auxiliary lens holder being arranged to permit passage of light through said exposure openings when said auxiliary lens holder is moved so that said auxiliary lens means are moved out of alignment with said objectives.

GORDON MILLIGAN PELTZ.
BARBARA IVINS.

REFERENCES CITED

The following references are of record in the file of this patent:

UNITED STATES PATENTS

| Number | Name | Date |
|---|---|---|
| 741,102 | Borsum | Oct. 13, 1903 |
| 2,063,985 | Coffey | Dec. 15, 1936 |
| 2,168,273 | Sauer | Aug. 1, 1939 |
| 2,271,340 | Jacobson | Jan. 27, 1942 |
| 2,286,810 | Ingles | June 16, 1942 |
| 2,292,894 | Mendelsohn | Aug. 11, 1942 |
| 2,320,423 | Githens | June 1, 1943 |
| 2,377,821 | Sperry | June 5, 1945 |
| 2,385,804 | Fitz | Oct. 2, 1945 |
| 2,417,240 | Crumrine | Mar. 11, 1947 |